United States Patent
Kunz et al.

(10) Patent No.: US 11,863,665 B2
(45) Date of Patent: Jan. 2, 2024

(54) SECURITY CAPABILITIES IN AN ENCRYPTION KEY REQUEST

(71) Applicant: Lenovo (Singapore) PTE. LTD., New Tech Park (SG)

(72) Inventors: Andreas Kunz, Ladenburg (DE); Dimitrios Karampatsis, Middlesex (GB); Genadi Velev, Darmstadt (DE); Roozbeh Atarius, La Jolla, CA (US)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 178 days.

(21) Appl. No.: 16/885,091

(22) Filed: May 27, 2020

(65) Prior Publication Data

US 2021/0051005 A1   Feb. 18, 2021

Related U.S. Application Data

(60) Provisional application No. 62/888,222, filed on Aug. 16, 2019.

(51) Int. Cl.
| | |
|---|---|
| *H04L 29/06* | (2006.01) |
| *H04L 9/08* | (2006.01) |
| *H04L 9/40* | (2022.01) |
| *H04W 12/04* | (2021.01) |

(52) U.S. Cl.
CPC .......... *H04L 9/0833* (2013.01); *H04L 9/0891* (2013.01); *H04L 63/20* (2013.01); *H04W 12/04* (2013.01); *H04L 2209/80* (2013.01)

(58) Field of Classification Search
CPC ..... H04L 9/0833; H04L 9/0891; H04L 63/20; H04L 2209/80; H04L 63/205; H04L 9/088; H04W 12/04; H04W 12/0431; H04W 12/0433; H04W 12/61; H04W 12/033
See application file for complete search history.

(56) References Cited

U.S. PATENT DOCUMENTS

| | | | |
|---|---|---|---|
| 7,631,023 B1 * | 12/2009 | Kaiser | ..................... G06F 3/061 |
| 8,886,931 B2 | 11/2014 | Matsunaka et al. | |
| 8,959,607 B2 | 2/2015 | Yadav et al. | |

(Continued)

FOREIGN PATENT DOCUMENTS

| | | | | |
|---|---|---|---|---|
| CN | 106131081 A | * | 11/2016 | ........ H04W 12/0431 |
| CN | 105474196 B | * | 11/2018 | ......... G06F 16/9566 |

(Continued)

OTHER PUBLICATIONS

PCT/IB2020/000415, "Notification of the Transmittal of the International Search Report and the Written Opinion of the International Searching Authority, or the Declaration", dated Sep. 17, 2020, pp. 1-13.

(Continued)

*Primary Examiner* — John B King
(74) *Attorney, Agent, or Firm* — Kunzler Bean & Adamson

(57) ABSTRACT

Apparatuses, methods, and systems are disclosed for security capabilities in an encryption key request. One method includes transmitting an encryption key request comprising security capabilities of a user equipment, wherein the encryption key request is for an application layer key. The method includes, in response to transmitting the encryption key request, receiving an encryption key response comprising a group encryption key.

12 Claims, 10 Drawing Sheets

(56) References Cited

U.S. PATENT DOCUMENTS

| | | | |
|---|---|---|---|
| 9,009,302 B2 * | 4/2015 | Detienne | H04L 63/065 709/224 |
| 2011/0182426 A1 * | 7/2011 | Roosta | H04L 9/0833 380/255 |
| 2014/0304777 A1 * | 10/2014 | Lehtovirta | H04L 63/164 726/3 |
| 2016/0255501 A1 * | 9/2016 | Van Phan | H04W 12/04 713/153 |
| 2017/0065771 A1 | 3/2017 | Newell et al. | |
| 2019/0065771 A1 * | 2/2019 | Seetharam | H04L 63/062 |
| 2019/0159025 A1 * | 5/2019 | Ben Henda | H04W 36/14 |
| 2019/0200228 A1 * | 6/2019 | Adrangi | H04L 9/3268 |
| 2020/0178048 A1 * | 6/2020 | Kim | H04W 4/40 |
| 2020/0344606 A1 * | 10/2020 | Zaus | H04W 84/042 |
| 2021/0051653 A1 * | 2/2021 | Park | H04W 72/21 |
| 2021/0160740 A1 * | 5/2021 | Kim | H04W 8/08 |
| 2022/0058901 A1 * | 2/2022 | Li | H04L 9/0822 |
| 2022/0060884 A1 * | 2/2022 | Zhu | H04L 61/5014 |
| 2022/0256434 A1 * | 8/2022 | Wang | H04W 40/20 |
| 2022/0272620 A1 * | 8/2022 | Ninglekhu | H04W 88/02 |

FOREIGN PATENT DOCUMENTS

| | | | |
|---|---|---|---|
| CN | 105009607 B * | 5/2019 | G06F 16/288 |
| WO | WO-2016114604 A1 * | 7/2016 | H04L 63/0428 |
| WO | WO-2016169232 A1 * | 10/2016 | |
| WO | 2017192161 A1 | 11/2017 | |
| WO | WO-2017192161 A1 * | 11/2017 | H04L 63/0823 |
| WO | 2018167307 A1 | 9/2018 | |
| WO | WO-2018201398 A1 * | 11/2018 | H04L 63/061 |
| WO | WO-2020029859 A1 * | 2/2020 | H04L 9/08 |

OTHER PUBLICATIONS

3GPP, "3rd Generation Partnership Project; Technical Specification Group Services and System Aspects; Study on architecture enhancements for the Evolved Packet System (EPS) and the 5G System (5GS) to support advanced V2X services (Release 16)", 3GPP TR 23.786 V16.1.0, Jun. 2019, pp. 1-119.

3GPP, "3rd Generation Partnership Project; Technical Specification Group Services and System Aspects; Procedures for the 5G System; Stage 2 (Release 16)", 3GPP TS 23.502 V16.1.1, Jun. 2019, pp. 1-495.

3GPP, "3rd Generation Partnership Project; Technical Specification Group Services and System Aspects; Proximity-based services (ProSe); Stage 2 (Release 15)", 3GPP TS 23.303 V15.1.0, Jun. 2018, pp. 1-130.

3GPP, "3rd Generation Partnership Project; Technical Specification Group Services and System Aspects; Proximity-based Services (ProSe); Security aspects (Release 15)", 3GPP TS 33.303 V15.0.0, Jun. 2018, pp. 1-90.

3GPP, "3rd Generation Partnership Project; Technical Specification Group Services and System Aspects; Study on Security Aspects of 3GPP support for Advanced V2X Services (Release 16)", 3GPP TR 33.836 V0.2.0, Jun. 2019, pp. 1-21.

3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V1.1.0, Jul. 2019, p. 1-50.

* cited by examiner

SECURITY CAPABILITIES IN AN ENCRYPTION KEY REQUEST

CROSS-REFERENCE TO RELATED APPLICATIONS

This application claims priority to U.S. Patent Application Ser. No. 62/888,222 entitled "APPARATUSES, METHODS, AND SYSTEMS FOR V2X GROUP KEY DISTRIBUTION" and filed on Aug. 16, 2019 for Andreas Kunz, which is incorporated herein by reference in its entirety.

FIELD

The subject matter disclosed herein relates generally to wireless communications and more particularly relates to security capabilities in an encryption key request.

BACKGROUND

The following abbreviations are herewith defined, at least some of which are referred to within the following description: Third Generation Partnership Project ("3GPP"), 5$^{th}$ Generation ("5G"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Server ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Key Management Function ("KMF"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multimedia Internet Keying ("MIKEY"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDP"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCI"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), and Worldwide Interoperability for Microwave Access ("WiMAX").

In certain wireless communications networks, encryption keys may be used.

BRIEF SUMMARY

Methods for security capabilities in an encryption key request are disclosed. Apparatuses and systems also perform the functions of the methods. One embodiment of a method includes transmitting an encryption key request comprising security capabilities of a user equipment, wherein the encryption key request is for an application layer key. In some embodiments, the method includes, in response to transmitting the encryption key request, receiving an encryption key response comprising a group encryption key.

One apparatus for security capabilities in an encryption key request includes a transmitter that transmits an encryption key request comprising security capabilities of a user equipment, wherein the encryption key request is for an application layer key. In various embodiments, the apparatus includes a receiver that, in response to transmitting the encryption key request, receives an encryption key response comprising a group encryption key.

Another embodiment of a method for security capabilities in an encryption key request includes receiving an encryption key request comprising security capabilities of a user equipment, wherein the encryption key request is for an application layer key. In some embodiments, the method includes, in response to receiving the encryption key request, transmitting an encryption key response comprising a group encryption key.

Another apparatus for security capabilities in an encryption key request includes a receiver that receives an encryption key request comprising security capabilities of a user equipment, wherein the encryption key request is for an application layer key. In various embodiments, the apparatus includes a transmitter that, in response to receiving the encryption key request, transmits an encryption key response comprising a group encryption key.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
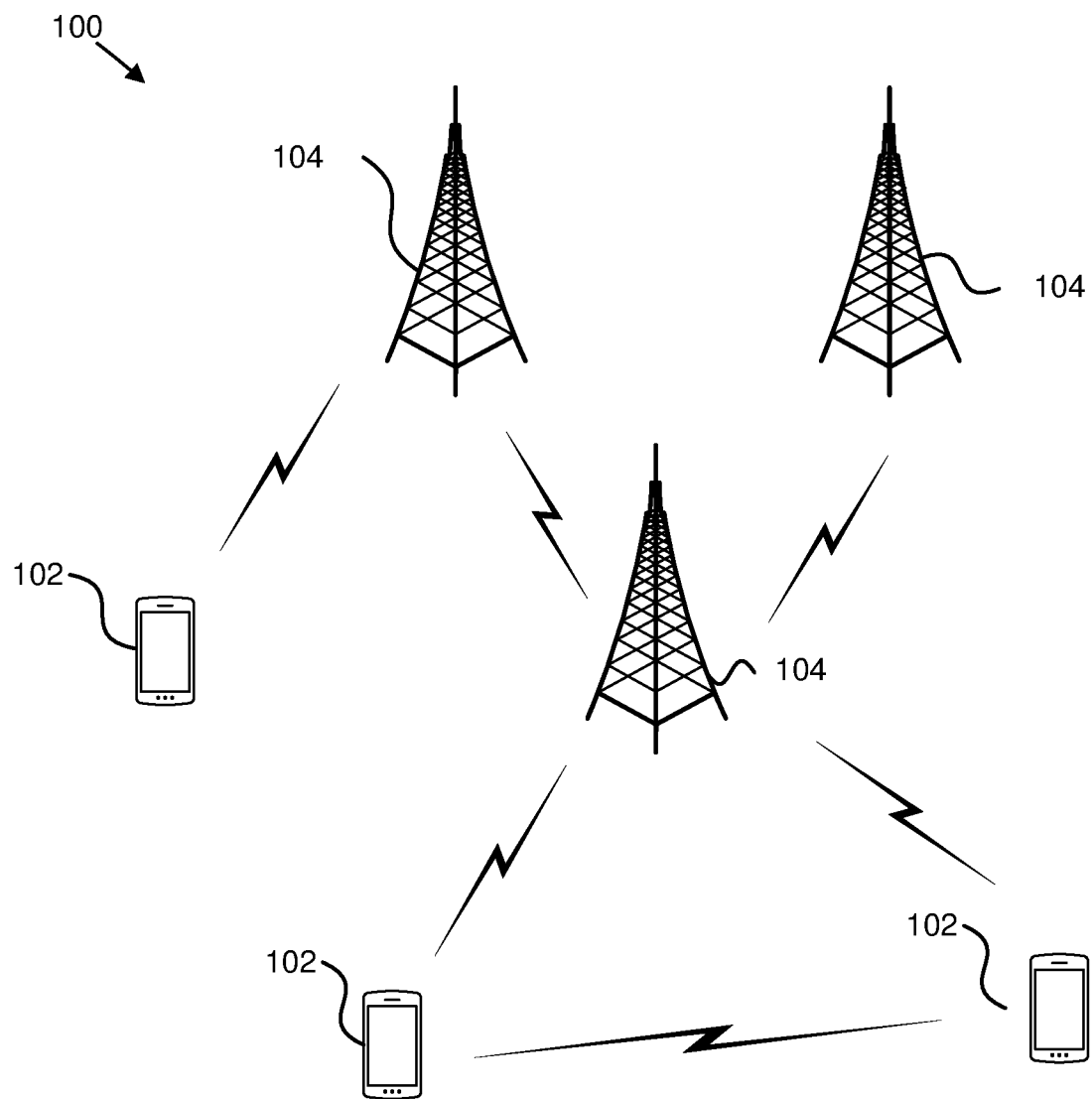
FIG. 1 is a schematic block diagram illustrating one embodiment of a wireless communication system for security capabilities in an encryption key request.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for security capabilities in an encryption key request. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 and/or a network unit 104 may transmit an encryption key request comprising security capabilities of a user equipment, wherein the encryption key request is for an application layer key. In some embodiments, the remote unit 102 and/or the network unit 104 may, in response to transmitting the encryption key request, receive an encryption key response comprising a group encryption key. Accordingly, the remote unit 102 and/or the network unit 104 may be used for security capabilities in an encryption key request.

In certain embodiments, a network unit 104 may receive an encryption key request comprising security capabilities of a user equipment, wherein the encryption key request is for an application layer key. In some embodiments, the network unit 104 may, in response to receiving the encryption key request, transmit an encryption key response comprising a group encryption key. Accordingly, the network unit 104 may be used for security capabilities in an encryption key request.

Figure 2:
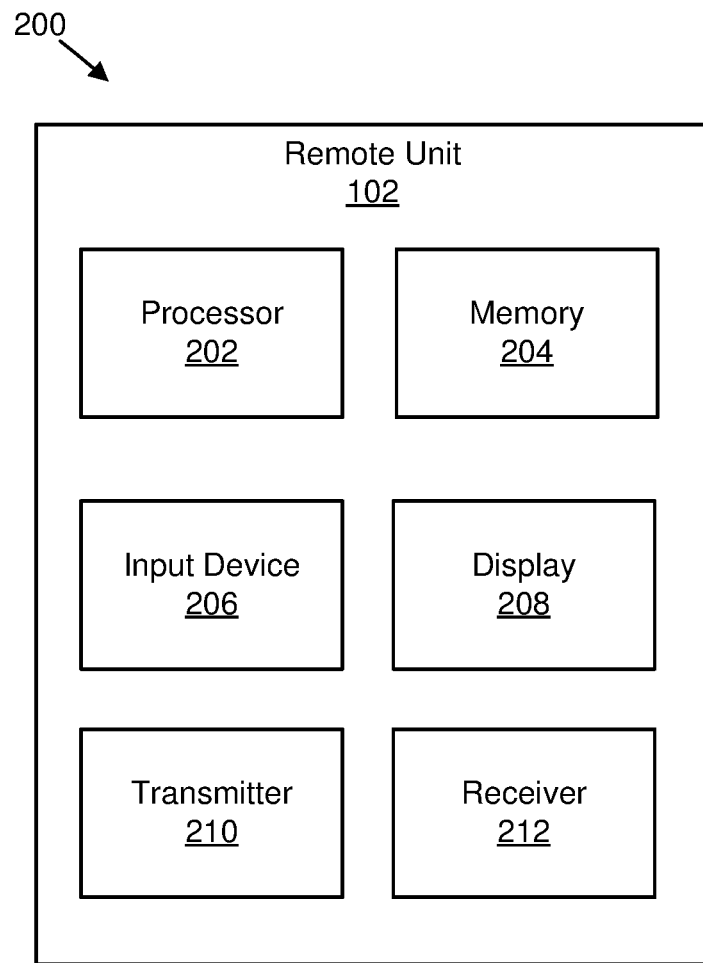
FIG. 2 is a schematic block diagram illustrating one embodiment of an apparatus that may be used for security capabilities in an encryption key request.

FIG. 2 depicts one embodiment of an apparatus 200 that may be used for security capabilities in an encryption key request. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 may transmit an encryption key request comprising security capabilities of a user equipment, wherein the encryption key request is for an application layer key. In various embodiments, the receiver 212 may, in response to transmitting the encryption key request, receives an encryption key response comprising a group encryption key.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
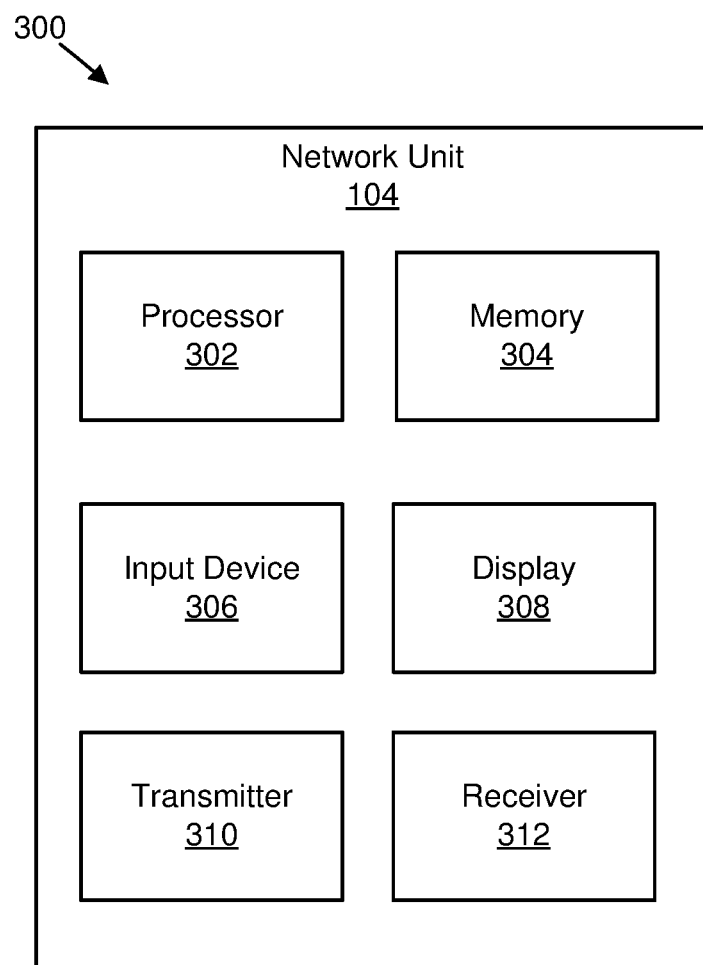
FIG. 3 is a schematic block diagram illustrating one embodiment of an apparatus that may be used for security capabilities in an encryption key request.

FIG. 3 depicts one embodiment of an apparatus 300 that may be used for security capabilities in an encryption key request. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 may transmit an encryption key request comprising security capabilities of a user equipment, wherein the encryption key request is for an application layer key. In various embodiments, the receiver 312 may, in response to transmitting the encryption key request, receive an encryption key response comprising a group encryption key.

In some embodiments, the receiver 312 may receive an encryption key request comprising security capabilities of a user equipment, wherein the encryption key request is for an application layer key. In various embodiments, the transmitter 310 may, in response to receiving the encryption key request, transmit an encryption key response comprising a group encryption key.

In certain embodiments, a group key may be provided to members of a group (e.g., V2X group). In various embodiments, a key may be provided efficiently (e.g., with less UE pre-configuration) to a UE for protecting communication over a PC5 interface. In some embodiments, group management (e.g., including controlling a number of UEs within a group) may be performed at an application layer. In certain embodiments, discovery of a group and group maintenance may be handled at application layer (e.g., based on V2X messages).

In various embodiments, functionality for V2X may be taken over from normative work already carried out for ProSe. In some embodiments, group communication differs from a service point of view as compared to group communication in V2X. In certain embodiments, in ProSe, a group consists of a group of UEs belonging to a public safety organization such as fire brigade or police, and so forth. In various embodiments, services used in a group are related to human communication (e.g., voice and/or video life streaming). In some embodiments, V2X may be seen as a kind of machine type communication without human interaction. In certain embodiments, services may be related to exchange vehicle status information (e.g., speed, distances, etc.), such as in a platoon or warning messages among others.

In various embodiments, for group key distribution to group members (e.g., V2X group members): 1) a UE requests a group key if registering to a network, if a current group key has expired, or at a configuration phase with an AS (e.g., V2X AS); and/or 2) group keys are pushed from a KMF (e.g., V2X KMF—potentially collocated with the AS) to the UE via a control plane.

In certain embodiments, a KMF may be a separate logical entity to enable a network operator to provide radio level parameters and a 3rd party (e.g., public safety service) to have control over provisioning keys. In some embodiments, if a separation between a KMF and an AS is not needed, then the KMF may be deployed as part of the AS. In various embodiments described herein, only an AS is used, but this may be replaced by a KMF and/or include a KMF.

In certain embodiments described herein, V2X is described, but the embodiments may be applicable to different services (e.g., such as those over PC5—for example, drones, etc.) and/or applications (e.g., using the PC5 for providing application layer security context information).

In a first embodiment, a UE may request an application level security context via a user plane.

The first embodiment may rely on application layer communication between an AS (e.g., V2X AS) and UEs (e.g., V2X UEs). In such an embodiment, it may be assumed that the UEs know (e.g., based on signaling from the AS or pre-configuration) to which groups (e.g., V2X groups) they belong.

Figure 4:
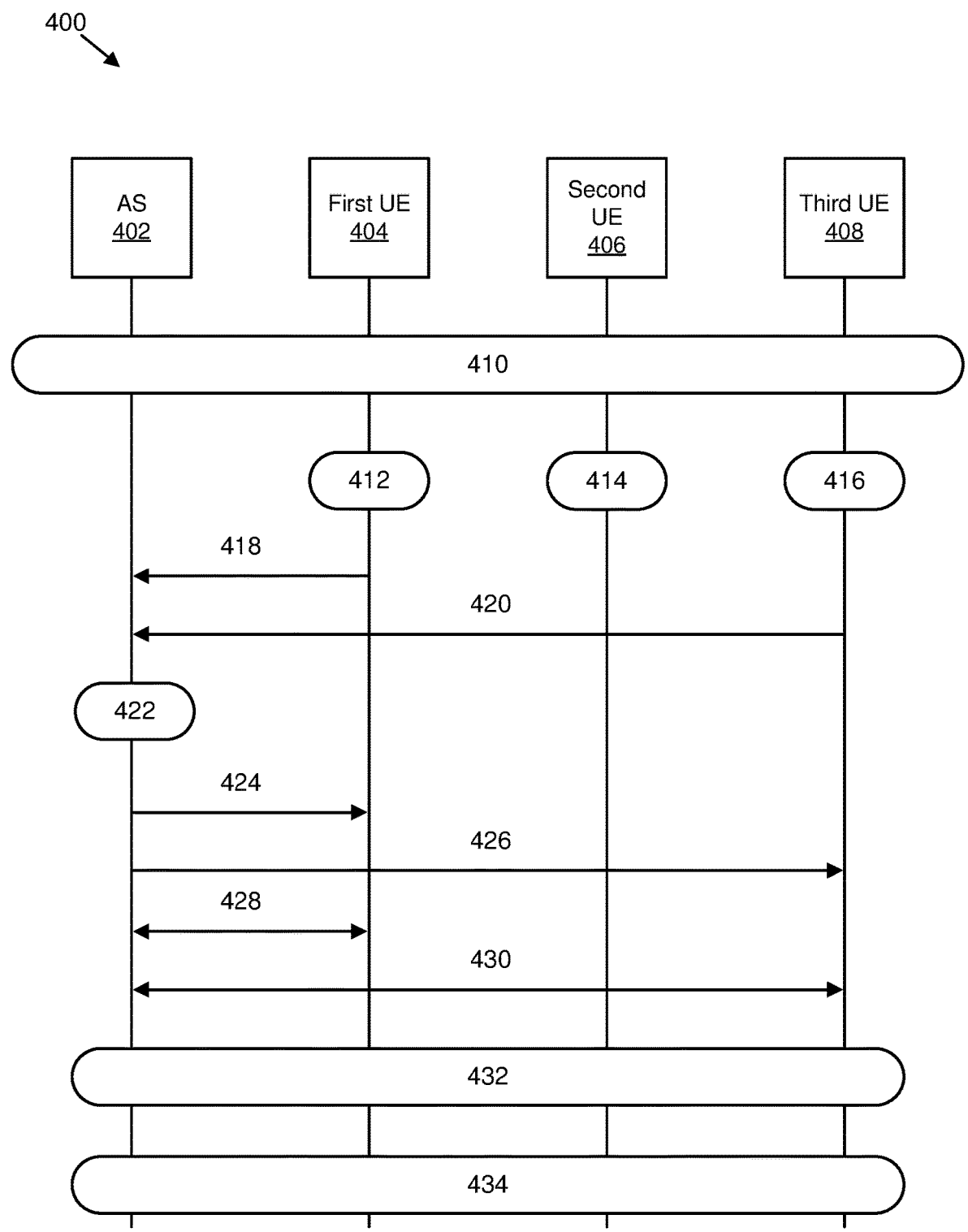
FIG. 4 is a diagram illustrating one embodiment of communications for key distribution.

FIG. 4 is a diagram illustrating one embodiment of communications 400 for key distribution. The communications 400 include communications between an AS 402 (e.g., V2X AS, a KMF, and/or an AS combined with a KMF), a first UE 404 (e.g., V2X UE), a second UE 406 (e.g., V2X UE), and a third UE 408 (e.g., V2X UE). As may be appreciated, each of the communications 400 described herein may include one or more messages.

In a first communication 410 transmitted between the AS 402 and each of the first UE 404, the second UE 406, and the third UE 408, the AS 402 may transmit service authorization and/or discovery between each of the first UE 404, the second UE 406, and the third UE 408.

In the first communication 410, if needed the first, second, and third UEs 404, 406, and 408 may be configured with any private keys, associated certificates or root certificate that they may need for contacting the AS 402 (e.g., which may be collocated with a KMF—V2X KMF), to enable the keys to be kept secret from an operator. The first, second, and third UEs 404, 406, and 408 may be pre-configured with an address of the AS 402 and/or the KMF.

In some embodiments, the AS 402 and a KMF may be configured with which subscriptions (e.g., mobile subscriptions or identities in certificates) are member of which groups. In certain embodiments, a KMF may pre-select an encryption algorithm for each group based on a local policy.

In the first communication 410, the first, second, and third UEs 404, 406, and 408 may fetch group communication parameters from the AS 402. As part of the first communication 410, the first, second, and third UEs 404, 406, and 408 may get their group identity and/or may be informed about whether bearer layer security is needed for the group. In various embodiments, the first, second, and third UEs 404, 406, and 408 may be provided with an address of a KMF that it uses for obtaining keys for a group. In the illustrated example, the first UE 404 may be configured 412 with a group ID, the second UE 406 may not be configured 414 as part of the group, and the third UE 408 may be configured 416 with the group ID.

In a second communication 418 transmitted from the first UE 404 to the AS 402, the first UE 404 may send a key request message to the AS 402. The key request message may include a group ID of a group for which it wants to fetch keys, a source L2 ID corresponding to the first UE 404, and UE security capabilities corresponding to the first UE 404 (e.g., including a set of encryption algorithms the first UE 404 supports).

In a third communication 420 transmitted from the third UE 408 to the AS 402, the third UE 408 may send a key request message to the AS 402. The key request message may include a group identity of a group for which it wants to fetch keys, a source L2 ID corresponding to the third UE 408, and UE security capabilities corresponding to the third UE 408 (e.g., including a set of encryption algorithms the third UE 408 supports).

The AS 402 may check 422 algorithms for the first UE 404 and the third UE 408.

In a fourth communication 424 transmitted from the AS 402 to the first UE 404, the AS 402 may respond to the key request message with transmitting a key response message to the first UE 404. If the check 422 of the algorithms is successful for a particular group, the key response message contains the group member identity and an encryption algorithm identifier that the first UE 404 should use when sending or receiving protected data for the group. Otherwise, if the check 422 of the algorithms is unsuccessful, the key response message contains an indicator of algorithm support failure as the first UE 404 does not support the required algorithm. The key response message may also contain a MIKEY key (e.g., VMK) and an associated ID (e.g., VMK ID) if the AS 402 decides to use a new MIKEY key.

In a fifth communication 426 transmitted from the AS 402 to the third UE 408, the AS 402 may respond to the key request message with transmitting a key response message to the third UE 408. If the check 422 of the algorithms is successful for a particular group, the key response message contains the group member identity and an encryption algorithm identifier that the third UE 408 should use when sending or receiving protected data for the group. Otherwise, if the check 422 of the algorithms is unsuccessful, the key response message contains an indicator of algorithm support failure as the third UE 408 does not support the required algorithm. The key response message may also contain a MIKEY key (e.g., VMK) and an associated ID (e.g., VMK ID) if the AS 402 decides to use a new MIKEY key.

In a sixth communication 428 transmitted between the AS 402 and the first UE 404, the AS 402 sends relevant group keys (e.g., VGKs), group key IDs (e.g., VGK IDs), and an expiry time to the first UE 404 using the MIKEY key (e.g., via one or more MIKEY messages).

In a seventh communication 430 transmitted between the AS 402 and the third UE 408, the AS 402 sends relevant group keys (e.g., VGKs), group key IDs (e.g., VGK IDs), and an expiry time to the third UE 408 using the MIKEY key (e.g., via one or more MIKEY messages).

In an eighth communication 432 transmitted between the AS 402, the first UE 404, the second UE 406, and/or the third UE 408, the first UE 404, the second UE 406, and/or the third UE 408 calculate a traffic key (e.g., VTK) and an encryption key (e.g., VEK) to protect traffic sent to the group. The first UE 404, the second UE 406, and/or the third UE 408 may do this by selecting a group key and using a next unused combination of a traffic key identity and/or counter. The first UE 404, the second UE 406, and/or the third UE 408 may protect data using the algorithm the fourth and/or fifth communications 424 and/or 426.

In a ninth communication 434 transmitted between the AS 402, the first UE 404, the second UE 406, and/or the third UE 408, a receiving UE may get the group identity and group member identity from a layer 2 header. The receiving UE may then use the received bits of a group key identifier to identify which group key was used by the sender. The receiving UE first checks that the group key is valid and, if so, the receiving UE calculates the traffic key and the encryption key to process the received message.

As may be appreciated, advantages of this embodiment may be similar to ProSe, may have no impact to a core network, but may have overhead with MIKEY signaling.

In a second embodiment, a UE may request an application level security context via a UDM and/or AMF. The second embodiment may include providing a group key and a security context (e.g., V2X security context—that may include the V2X security configuration) via from the UDM. In such an embodiment, configuration of a group identity in the UE and/or providing the security context may be performed via the UDM. In some embodiments, an application layer (e.g., V2X) configuration may be provided to a UE.

Figure 5:
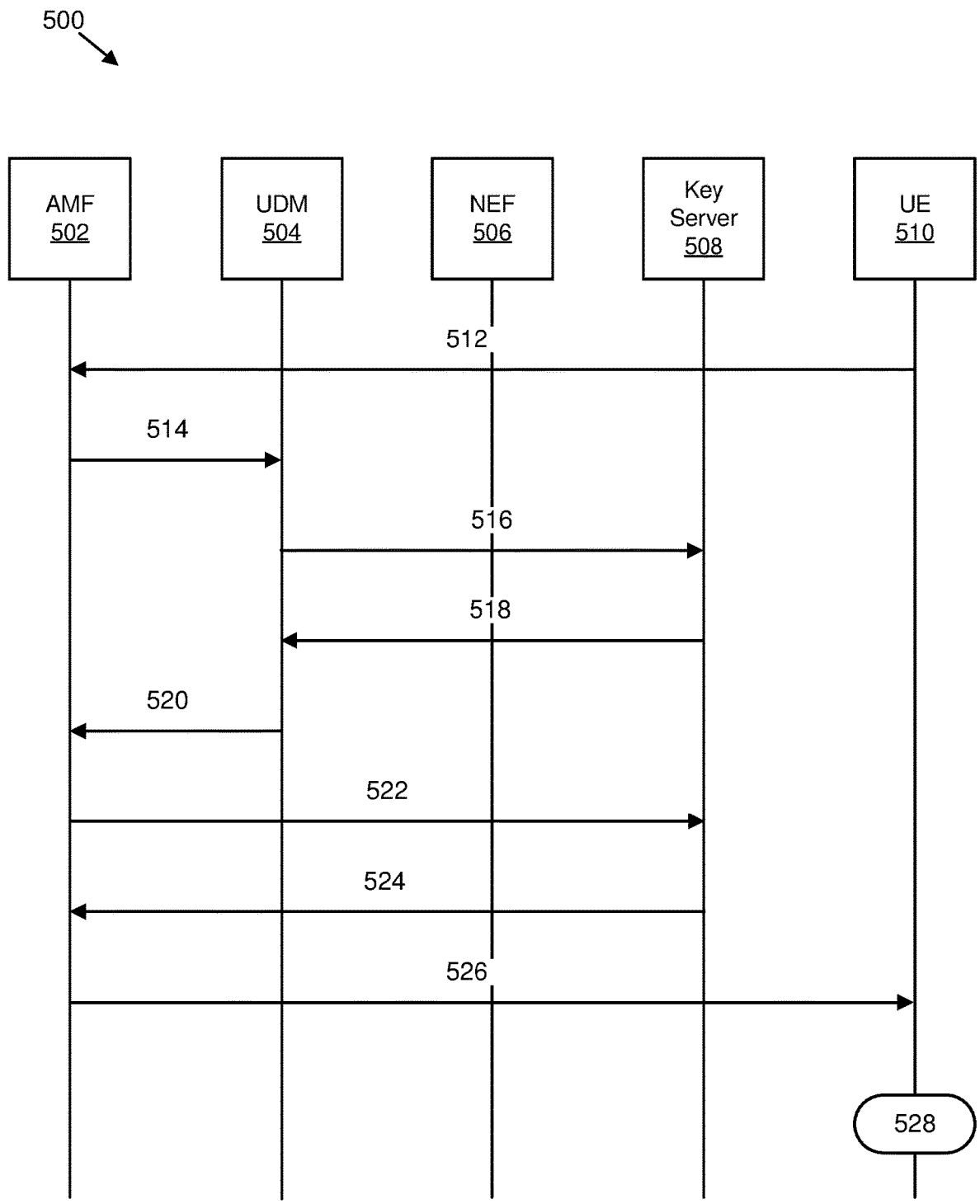
FIG. 5 is a diagram illustrating another embodiment of communications for key distribution.

FIG. 5 is a diagram illustrating another embodiment of communications 500 for key distribution. The communications 500 include communications between an AMF 502, a UDM 504, an NEF 506, a key server 508 (e.g., key management server, V2X key management server), and a UE 510 (e.g., V2X UE). As may be appreciated, each of the communications 500 described herein may include one or more messages.

In a first communication 512 transmitted from the UE 510 to the AMF 502, the UE 510 may send an indication in NAS MM signaling (e.g., trigger, NAS request message) indicating that the UE 510 is capable for communication over PC5 (e.g., V2X capable) and/or indicating a corresponding configuration (e.g., V2X configuration, security configuration, security update). The NAS MM signaling may include a registration request (or registration request) with an explicit indication for security provisioning (e.g., V2X security provisioning), a UE policy provisioning request, a group key expiration trigger, any other NAS message, and/or any other NAS transport message. In some embodiments, the UE 510 may send its group ID in the NAS MM signaling.

In a second communication 514 transmitted from the AMF 502 to the UDM 504, the AMF 502 may request subscription information to the UDM 504 according to the NAS MM signaling in the first communication 512. The AMF 502 may forward indications received from the UE 510 to the UDM 504 with the request for the subscription information.

In an optional third communication 516 transmitted from the UDM 504 to the key server 508, the UDM 504 may request a security context (e.g., V2X security context) for the UE 510 by querying the key server 508 (e.g., V2X KMF) potentially via the NEF 506, and the request may include UE 510 security capabilities (e.g., including a set of encryption algorithms the UE 510 supports).

In an optional fourth communication 518 transmitted from the key server 508 to the UDM 504, the key server 508 may fetch group communication parameters from an AS if not co-located with the key server 508 (e.g., V2X AS) and selects an encryption algorithm identifier that the UE 510 should use for sending or receiving protected data for a particular group member identity. The key server 508, in the fourth communication 518, sends a relevant group key (e.g., VGK), group ID (e.g., VGK ID), encryption algorithm identifier, and expiry time to the UDM 504. If the UE 510 belongs to several groups, a security context (e.g., V2X security context) including a group key (e.g., VGK), a group ID (e.g., VGK ID), an encryption algorithm identifier, and an expiry time may be provided for each group.

In a fifth communication 520 transmitted from the UDM 504 to the AMF 502, the UDM 504 provides a subscription information response to the AMF 502. The subscription information response may include the configuration (e.g., V2X) that is to be used by the UE 510 and the security context (e.g., V2X security context) in a transparent container for transmission to the UE 510. The UDM 504 may use a UE parameter update via the UDM 504 control plane procedure via direct transmission to the AMF 502, then transmission from the AMF 502 to the UE 510. The UDM 504 control plane procedure may be enhanced to include configuration parameters (e.g., V2X configuration parameters) in the UE parameter update. If the third and fourth communications 516 and 518 are made, the UE parameter update may include the relevant group key (e.g., VGK), group ID (e.g., VGK ID), encryption algorithm identifier, and expiry time.

If the third and fourth communications 516 and 518 are not made, then an optional sixth communication 522 and an optional seventh communication 524 may be made.

In the optional sixth communication 522 transmitted from the AMF 502 to the key server 508, the AMF 502 may request directly the security context (e.g., V2X security context) for the UE 510 by querying the key server 508 (e.g., V2X KMF) potentially via the NEF 506, and the request may include UE 510 security capabilities (e.g., including a set of encryption algorithms the UE 510 supports).

In the optional seventh communication 524 transmitted from the key server 508 to the AMF 502, the key server 508 may fetch group communication parameters from an AS if not co-located with the key server 508 (e.g., V2X AS) and selects an encryption algorithm identifier that the UE 510 should use for sending or receiving protected data for a particular group member identity. The key server 508, in the fourth communication 518, sends a relevant group key (e.g., VGK), group ID (e.g., VGK ID), encryption algorithm identifier, and expiry time to the AMF 502. If the UE 510 belongs to several groups, a security context (e.g., V2X security context) including a group key (e.g., VGK), a group ID (e.g., VGK ID), an encryption algorithm identifier, and an expiry time may be provided for each group.

In an eighth communication 526 transmitted from the AMF 502 to the UE 510, the AMF 502 provides the configuration (e.g., V2X configuration) and the security context (e.g., V2X security context) that includes the group key (e.g., VGK), group ID (e.g., VGK ID), the encryption algorithm identifier, and the expiry time to the UE 510 in an NAS response message. After the eight communication 526 is successful, the AMF 502 may inform the key server 508 about the successful communication either directly or via the UDM 504.

The UE 510 calculates a traffic key (e.g., VTK) and an encryption key (e.g., VEK) to protect traffic it sends to a configured group. The UE 510 does this by selecting the group key and using a next unused combination of a traffic key identity and counter. The UE 510 then protects data using the algorithm given in the eighth communication 526.

As may be appreciated, in some embodiments, providing key information in an NAS response may facilitate that no user plane is required (e.g., a UE or V2X UE may have only a PC5 subscription and does not need to have a user plane roaming subscription). In such embodiments, exposure signaling between a UDM and an external AS via NEF may be reused for key server signaling.

In a third embodiment, a UE may request application level security context via a PCF.

Figure 6:
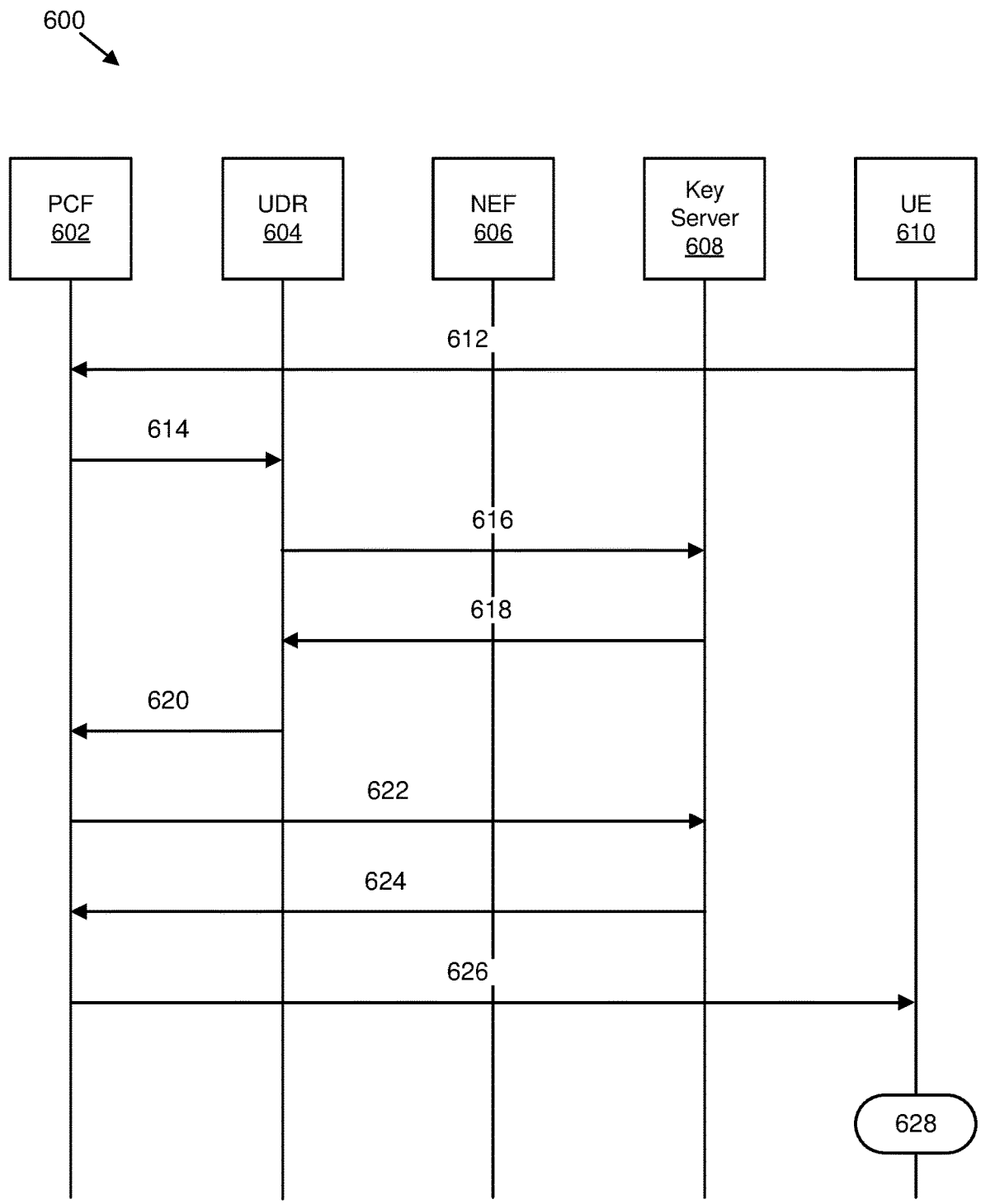
FIG. 6 is a diagram illustrating a further embodiment of communications for key distribution.

FIG. 6 is a diagram illustrating a further embodiment of communications 600 for key distribution. The communications 600 include communications between a PCF 602, a UDR 604, an NEF 606, a key server 608 (e.g., key management server, V2X key management server), and a UE 610 (e.g., V2X UE). As may be appreciated, each of the communications 600 described herein may include one or more messages.

In a first communication 612 transmitted from the UE 610 to the PCF 602, the UE 610 may send an indication in NAS MM signaling (e.g., trigger, NAS request message) indicating that the UE 610 is capable for communication over PC5 (e.g., V2X capable) and/or indicating a corresponding configuration (e.g., V2X configuration, security configuration, security update). The NAS MM signaling may include a registration request (or registration request) with an explicit indication for security provisioning (e.g., V2X security provisioning), a UE policy provisioning request, a group key expiration trigger, any other NAS message, and/or any other NAS transport message. In some embodiments, the UE 610 may send its group ID in the NAS MM signaling.

In a second communication 614 transmitted from the PCF 602 to the UDR 604, the PCF 602 may request subscription information to the UDR 604 according to the NAS MM signaling in the first communication 612. The PCF 602 may forward indications received from the UE 610 to the UDR 604 with the request for the subscription information.

In an optional third communication 616 transmitted from the UDR 604 to the key server 608, the UDM 604 may request a security context (e.g., V2X security context) for the UE 610 by querying the key server 608 (e.g., V2X KMF) potentially via the NEF 606, and the request may include UE 610 security capabilities (e.g., including a set of encryption algorithms the UE 610 supports).

In an optional fourth communication 618 transmitted from the key server 608 to the UDR 604, the key server 608 may fetch group communication parameters from an AS if not co-located with the key server 608 (e.g., V2X AS) and selects an encryption algorithm identifier that the UE 610 should use for sending or receiving protected data for a particular group member identity. The key server 608, in the fourth communication 618, sends a relevant group key (e.g., VGK), group ID (e.g., VGK ID), encryption algorithm identifier, and expiry time to the UDR 604. If the UE 610 belongs to several groups, a security context (e.g., V2X security context) including a group key (e.g., VGK), a group ID (e.g., VGK ID), an encryption algorithm identifier, and an expiry time may be provided for each group.

In a fifth communication 620 transmitted from the UDR 604 to the PCF 602, the UDR 604 provides a subscription information response to the PCF 602. The subscription information response may include the configuration (e.g., V2X) that is to be used by the UE 610 and the security context (e.g., V2X security context) in a transparent container for transmission to the UE 610. The UDR 604 may use a UE parameter update via the UDR 604 control plane procedure via direct transmission to the PCF 602, then transmission from the PCF 602 to the UE 610. The UDR 604 control plane procedure may be enhanced to include configuration parameters (e.g., V2X configuration parameters) in the UE parameter update. If the third and fourth communications 616 and 618 are made, the UE parameter update may include the relevant group key (e.g., VGK), group ID (e.g., VGK ID), encryption algorithm identifier, and expiry time.

If the third and fourth communications 616 and 618 are not made, then an optional sixth communication 622 and an optional seventh communication 624 may be made.

In the optional sixth communication 622 transmitted from the PCF 602 to the key server 608, the PCF 602 may request directly the security context (e.g., V2X security context) for the UE 610 by querying the key server 608 (e.g., V2X KMF) potentially via the NEF 606, and the request may include UE 610 security capabilities (e.g., including a set of encryption algorithms the UE 610 supports).

In the optional seventh communication 624 transmitted from the key server 608 to the PCF 602, the key server 608 may fetch group communication parameters from an AS if not co-located with the key server 608 (e.g., V2X AS) and selects an encryption algorithm identifier that the UE 610 should use for sending or receiving protected data for a particular group member identity. The key server 608, in the fourth communication 618, sends a relevant group key (e.g., VGK), group ID (e.g., VGK ID), encryption algorithm identifier, and expiry time to the PCF 602. If the UE 610 belongs to several groups, a security context (e.g., V2X security context) including a group key (e.g., VGK), a group ID (e.g., VGK ID), an encryption algorithm identifier, and an expiry time may be provided for each group.

In an eighth communication 626 transmitted from the PCF 602 to the UE 610, the PCF 602 provides the configuration (e.g., V2X configuration) and the security context (e.g., V2X security context) that includes the group key (e.g., VGK), group ID (e.g., VGK ID), the encryption algorithm identifier, and the expiry time to the UE 610 in an NAS response message. After the eight communication 626 is successful, the PCF 602 may inform the key server 608 about the successful communication either directly or via the UDR 604.

The UE 610 calculates a traffic key (e.g., VTK) and an encryption key (e.g., VEK) to protect traffic it sends to a configured group. The UE 610 does this by selecting the group key and using a next unused combination of a traffic key identity and counter. The UE 610 then protects data using the algorithm given in the eighth communication 626.

In the first communication 612, the UE 610 may send a trigger to the PCF 602 to retrieve keys for one or more group IDs (e.g., V2X group IDs) within an uplink NAS transport message. The uplink NAS transport message may be a UE policy provisioning request. In some embodiments, an AMF may transparently forward the uplink NAS transport message to the PCF 602 within an Npcf_UEPolicyControl_Update service message.

In a fourth embodiment, a UE includes in an NAS message a security container (e.g., V2X security container) that contains: 1) the UEs security capabilities; and/or 2) one or more group IDs (e.g., identified by a destination layer-2 ID) for which the UE is interested in retrieve updated keys. In such an embodiment, the PCF extracts the information from the security container and retrieves the keys from a key server. The PCF then provides retrieved keys to the UE by updating configuration information (e.g., V2X configuration information). Moreover, the PCF delivers the keys within a UE configuration update message for transparent policy delivery. Further, a UE configuration update message may include an additional container that includes security keys (e.g., V2X security keys) for the group IDs corresponding to the UE's request.

Figure 7:
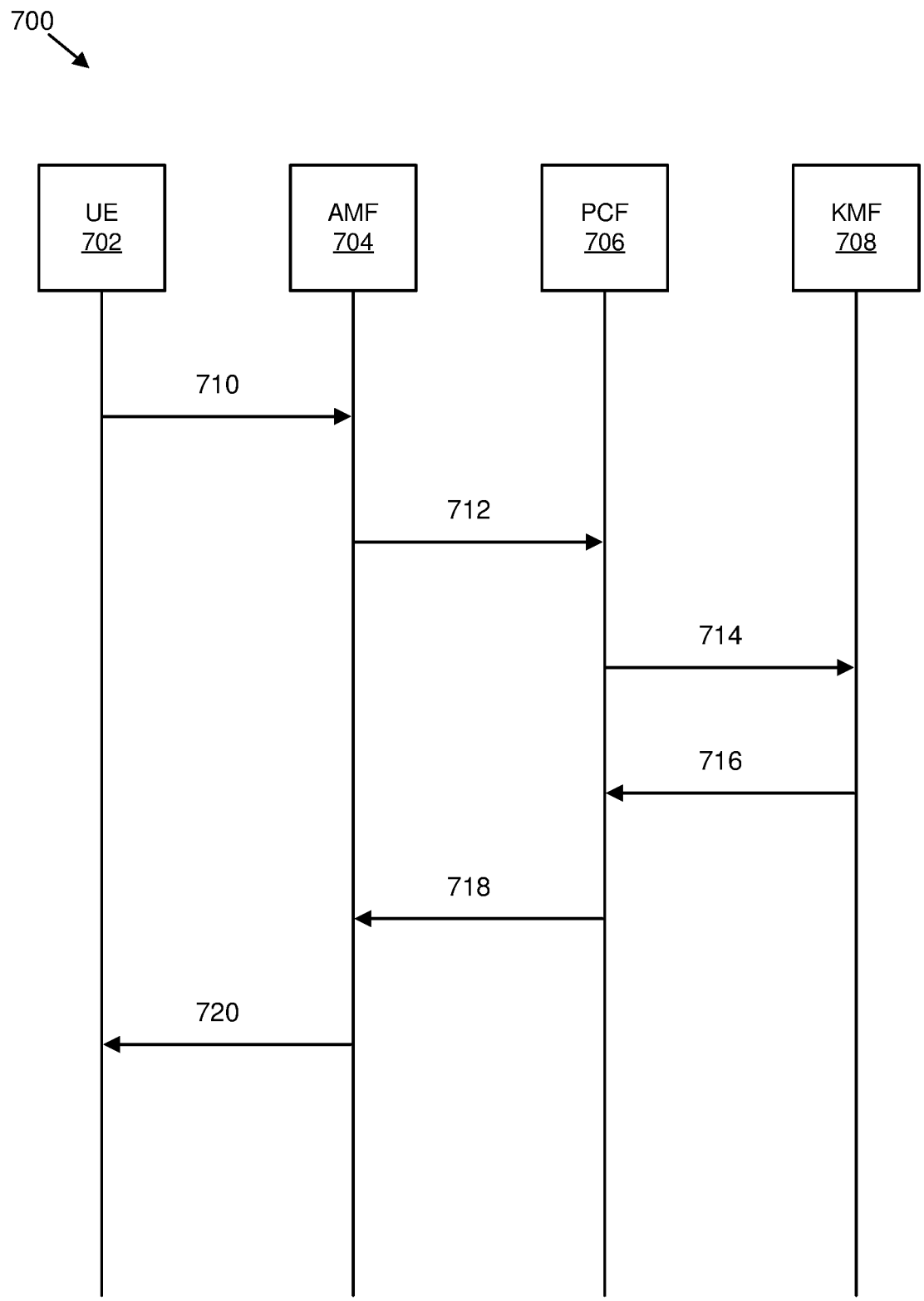
FIG. 7 is a diagram illustrating yet another embodiment of communications for key distribution.

FIG. 7 shows one example of the fourth embodiment. Specifically, FIG. 7 is a diagram illustrating yet another embodiment of communications 700 for key distribution. The communications 700 include communications between a UE 702, an AMF 704, a PCF 706, and a KMF 708 (e.g., V2X KMF). As may be appreciated, each of the communications 700 described herein may include one or more messages.

In a first communication 710 transmitted from the UE 702 to the AMF 704, the UE 704 may send a UE policy provisioning request to the AMF 704 to retrieve keys for one or more group IDs (e.g., V2X group IDs) within an uplink NAS transport message. The UE 702 includes in the uplink NAS transport message a security container (e.g., V2X security container) that contains the UE's 702 security capabilities and one or more group IDs (e.g., identified by a destination layer-2 ID) that the UE 702 is interested to retrieve updated keys.

In a second communication 712 transmitted from the AMF 704 to the PCF 706, the AMF 704 transparently forwards the uplink NAS transport message to the PCF 706 within an Npcf_UEPolicyControl_Update service message.

In a third communication 714 transmitted from the PCF 706 to the KMF 708 and in a fourth communication 716 transmitted from the KMF 708 to the PCF 706, the PCF 706 extracts the information from the security container and retrieves the security contexts (e.g., group key (e.g., VGK), group key ID (e.g., VGK ID), encryption algorithm identifier, and expiry time) from the KMF 708. The PCF 706 then provides the retrieved security contexts to the UE 702 by updating configuration information (e.g., V2X configuration information). The PCF 706 may use the exposure service via NEF.

In a fifth communication 718 transmitted from the PCF 706 to the AMF 704, the PCF 706 sends a UE configuration update message for transparent policy delivery to the UE 702 via the AMF 704 in a Namf_N1N2Communication message. The UE configuration update message includes an additional container that includes the security contexts for the group IDs according to the UE's 702 request.

In a sixth communication 720 transmitted from the AMF 704 to the UE 702, the AMF 704 forwards the UE configuration update message to the UE 702.

In a fifth embodiment, group keys may be pushed from a VMK to a UE via a control plane. In the fifth embodiment, an AS (e.g., V2X AS) may provide updated security keys to UEs using an AF parameter provision update procedure. In such an embodiment, the AS acts as an application function and provides the security keys (e.g., V2X security keys) using an Nnef parameter provisioning service operation. A PCF is notified of new security keys and provides updated configuration information to the UEs of a corresponding group (e.g., V2X group) using a UE policy delivery procedure. In this embodiment, the AS may be responsible for ensuring all UEs in the group have up to date security keys. Moreover, in this embodiment, there is no need for the UEs to request keys as in other embodiments.

Figure 8:
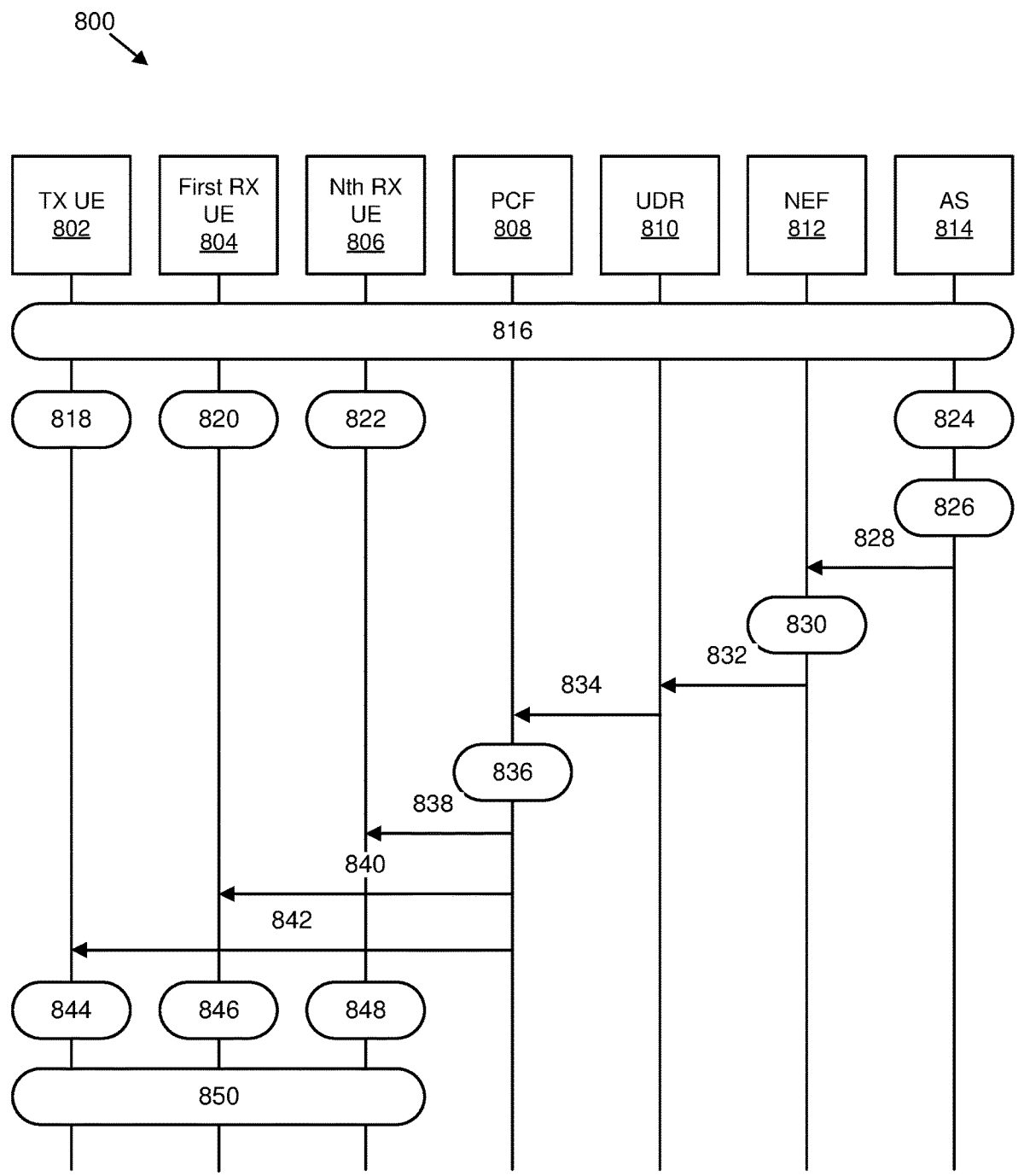
FIG. 8 is a diagram illustrating a further embodiment of communications for key distribution.

FIG. 8 is a diagram illustrating a further embodiment of communications 800 for key distribution according to the fifth embodiment. The communications 800 include communications between a TX UE 802, a first RX UE 804, an Nth RX UE 806, a PCF 808, a UDR 810, an NEF 812, and an AS 814 (e.g., V2X AS). As may be appreciated, each of the communications 800 described herein may include one or more messages.

As may be appreciated, in a first communication 816 transmitted between the TX UE 802, the first RX UE 804, the Nth RX UE 806, the PCF 808, the UDR 810, the NEF 812, and the AS 814, group management (e.g., V2X group management, discovery) may be handled at an application layer. The TX UE 802 application layer (e.g., V2X application layer) may provide 818 group identifier information. The first RX UE 804 application layer (e.g., V2X application layer) may provide 820 group identifier information. The Nth RX UE 806 application layer (e.g., V2X application layer) may provide 822 group identifier information.

The AS 814 may be aware 824 of each UE security capabilities (e.g., preconfigured or information retrieved via an application layer mechanism, algorithms supported in each UE).

The AS 814 may decide 826 to update the security keys of a group (e.g., V2X group) (e.g., determine GPSI associated with an application layer group ID). The AS 814 identifies an external identifier of each UE in the group or an external group identifier of the group.

In a second communication 828 transmitted from the AS 814 to the NEF 812, the AS 814 invokes an Nnef parameter provisioning update message. The Nnef parameter provisioning update message includes the GPSI or the group ID of the UEs, and, as parameter data, the group ID (e.g., V2X group ID) and the security key associated with the group (e.g., V2X group).

The NEF 812 retrieves 830 the SUPI of each UE.

In a third communication 832 transmitted from the NEF 812 to the UDR 810, the NEF 812 invokes an Nudr_DM_Update message storing the information as a new policy set entry within policy data of the subscription of the UE (e.g., identified by the SUPI) by transmission to the UDR 810.

In a fourth communication 834 transmitted from the UDR 810 to the PCF 808, the UDR 810 notifies the PCF 808 of the policy data (e.g., the PCF 808 may be subscribed to the UDR 810 to be informed on changes of the policy data of the UE).

The PCF 808 creates 836 new configuration information (e.g., V2X configuration information including V2X security configuration) and provides the configuration information to each UE using a UE policy delivery procedure in a fifth communication 838 transmitted from the PCF 808 to the Nth RX UE 806, in a sixth communication 840 transmitted from the PCF 808 to the first RX UE 804, and in a seventh communication 842 transmitted from the PCF 808 to the TX UE 802.

When a UE in the group needs to send a message, the UE retrieves the key from the configuration information (e.g., V2X configuration information). Furthermore, the TX UE 802 may determine 844 source and/or destination layer-2 IDs. Moreover, the first RX UE 804 may determine 846 source and/or destination layer-2 IDs. In addition, the Nth RX UE 806 may determine 848 source and/or destination layer-2 IDs.

In an eight communication 850 transmitted between the TX UE 802, the first RX UE 804, and the Nth RX UE 806, the UEs that receive a message retrieve the key of the group from the configuration information.

As may be appreciated, provisioning in NAS may have the advantage that no user plane is required (e.g., a UE can have only a PC5 subscription and does not need to have a user plane roaming subscription). Thus, exposure signaling between a UDR and an external AS via an NEF may be reused for KMF signaling.

Figure 9:
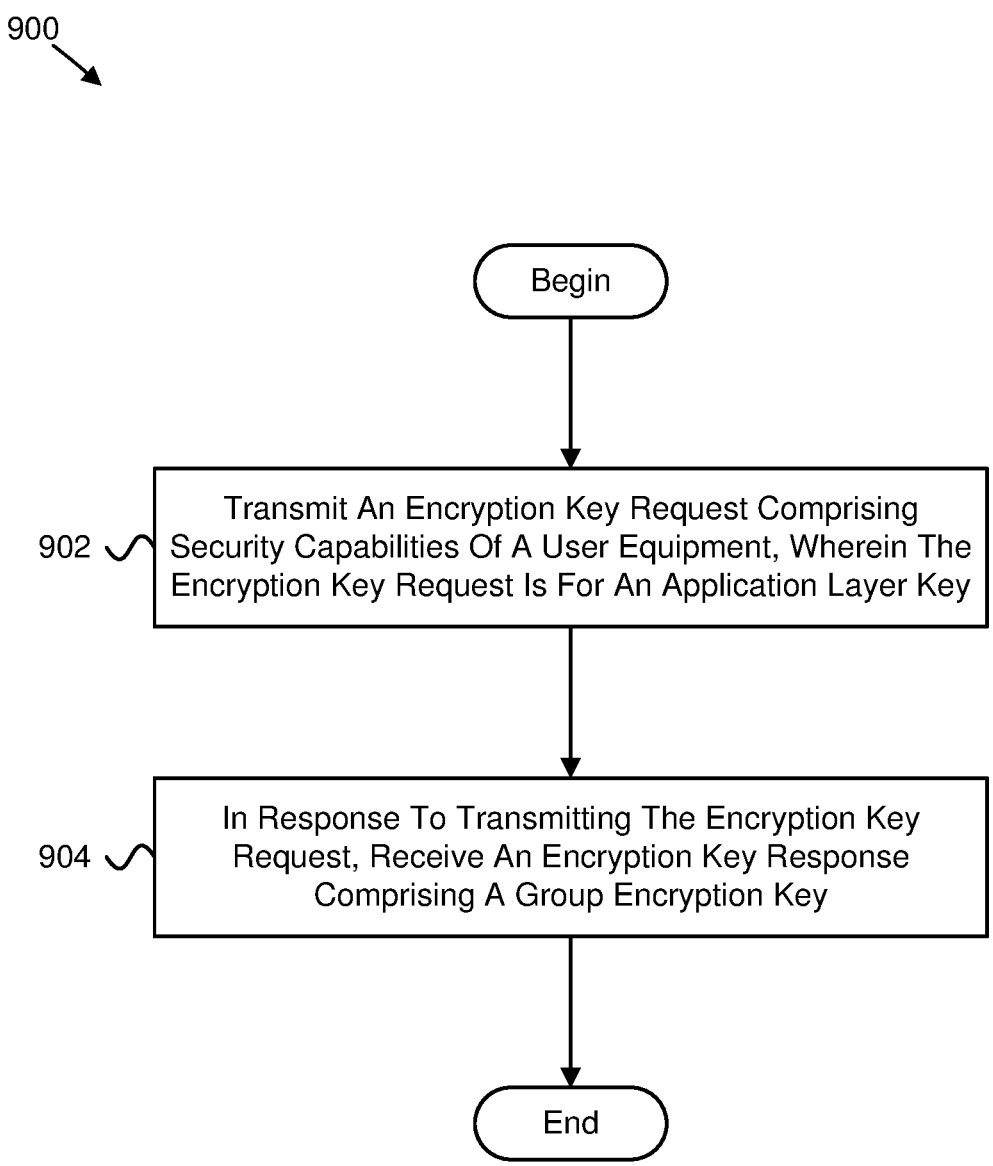
FIG. 9 is a flow chart diagram illustrating one embodiment of a method for security capabilities in an encryption key request.

FIG. 9 is a flow chart diagram illustrating one embodiment of a method 900 for security capabilities in an encryption key request. In some embodiments, the method 900 is performed by an apparatus, such as the remote unit 102 and/or the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes transmitting 902 an encryption key request comprising security capabilities of a user equipment, wherein the encryption key request is for an application layer key. In some embodiments, the method 900 includes, in response to transmitting the encryption key request, receiving 904 an encryption key response comprising a group encryption key.

In certain embodiments, the encryption key request is transmitted from the user equipment to an application management function device or a policy control function device. In some embodiments, the encryption key request is part of a non-access stratum request. In various embodiments, the non-access stratum request comprises a policy provisioning request.

In one embodiment, the encryption key request is part of a registration request. In certain embodiments, the encryption key response is received by the user equipment from an application management function device or a policy control function device. In some embodiments, the encryption key response is part of a non-access stratum response.

In various embodiments, the encryption key request is transmitted from an application management function device or a policy control function device to a unified data device or a key management server. In one embodiment, the encryption key response is received by an application management function device or a policy control function device from a unified data device or a key management server. In certain embodiments, the encryption key request is transmitted from a unified data device to a key management server.

In some embodiments, the encryption key response is received by a unified data device from a key management server. In various embodiments, the encryption key response comprises a key identifier. In one embodiment, the encryption key response comprises an expiration time.

Figure 10:
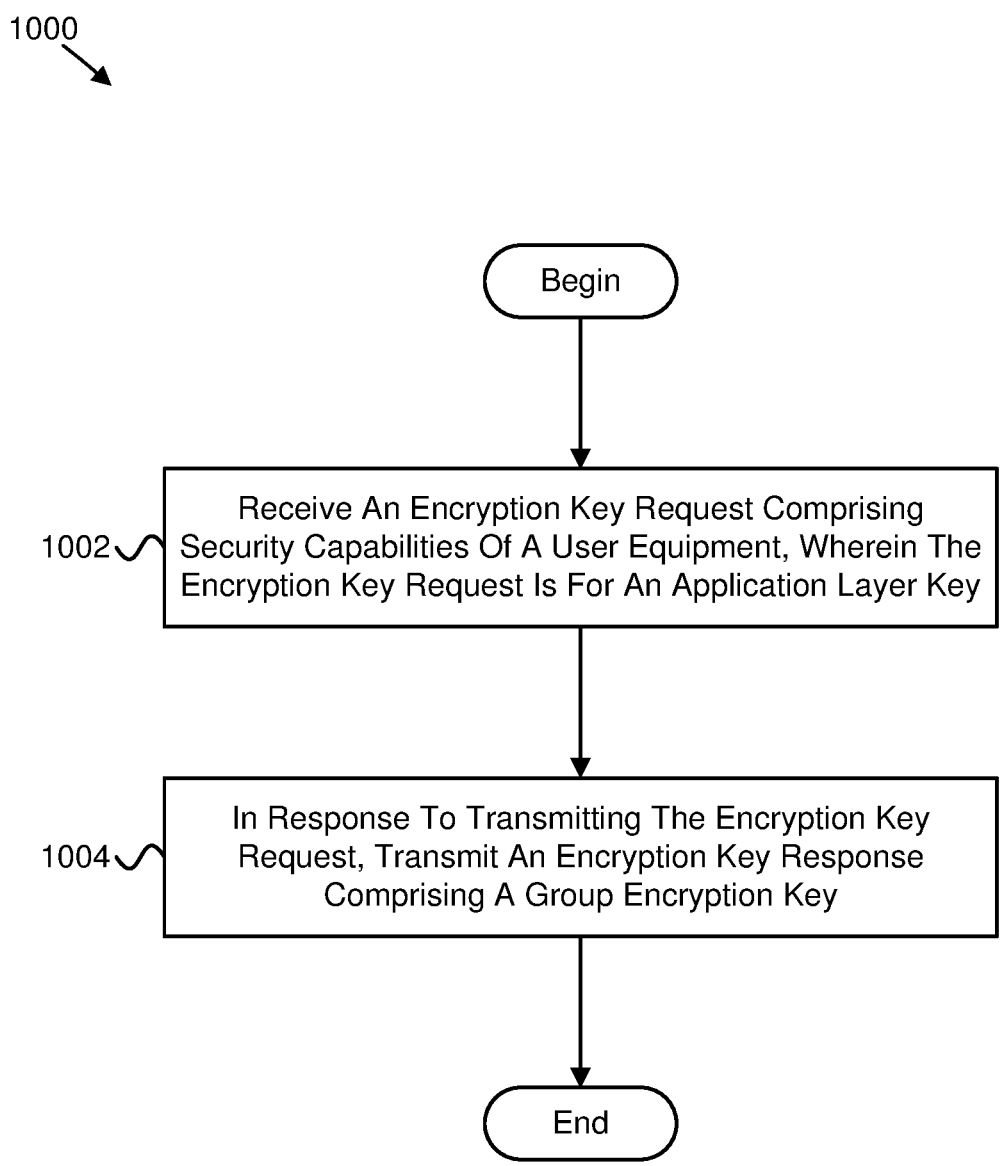
FIG. 10 is a flow chart diagram illustrating another embodiment of a method for security capabilities in an encryption key request.

FIG. 10 is a flow chart diagram illustrating another embodiment of a method 1000 for security capabilities in an encryption key request. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002 an encryption key request comprising security capabilities of a user equipment, wherein the encryption key request is for an application layer key. In some embodiments, the method 1000 includes, in response to receiving the encryption key request, transmitting 1004 an encryption key response comprising a group encryption key.

In certain embodiments, the encryption key request is transmitted from the user equipment and received by an application management function device or a policy control function device. In some embodiments, the encryption key request is part of a non-access stratum request. In various embodiments, the non-access stratum request comprises a policy provisioning request.

In one embodiment, the encryption key request is part of a registration request. In certain embodiments, the encryption key response is received by the user equipment and transmitted from an application management function device or a policy control function device. In some embodiments, the encryption key response is part of a non-access stratum response.

In various embodiments, the encryption key request is transmitted from an application management function device or a policy control function device and received by a unified data device or a key management server. In one embodiment, the encryption key response is received by an application management function device or a policy control function device and transmitted from a unified data device or a key management server. In certain embodiments, the encryption key request is transmitted from a unified data device and received by a key management server.

In some embodiments, the encryption key response is received by a unified data device and transmitted from a key management server. In various embodiments, the encryption key response comprises a key identifier. In one embodiment, the encryption key response comprises an expiration time.

In one embodiment, a method comprises: transmitting an encryption key request comprising security capabilities of a user equipment, wherein the encryption key request is for an application layer key; and in response to transmitting the encryption key request, receiving an encryption key response comprising a group encryption key.

In certain embodiments, the encryption key request is transmitted from the user equipment to an application management function device or a policy control function device.

In some embodiments, the encryption key request is part of a non-access stratum request.

In various embodiments, the non-access stratum request comprises a policy provisioning request.

In one embodiment, the encryption key request is part of a registration request.

In certain embodiments, the encryption key response is received by the user equipment from an application management function device or a policy control function device.

In some embodiments, the encryption key response is part of a non-access stratum response.

In various embodiments, the encryption key request is transmitted from an application management function device or a policy control function device to a unified data device or a key management server.

In one embodiment, the encryption key response is received by an application management function device or a policy control function device from a unified data device or a key management server.

In certain embodiments, the encryption key request is transmitted from a unified data device to a key management server.

In some embodiments, the encryption key response is received by a unified data device from a key management server.

In various embodiments, the encryption key response comprises a key identifier.

In one embodiment, the encryption key response comprises an expiration time.

In one embodiment, an apparatus comprises: a transmitter that transmits an encryption key request comprising security capabilities of a user equipment, wherein the encryption key request is for an application layer key; and a receiver that, in response to transmitting the encryption key request, receives an encryption key response comprising a group encryption key.

In certain embodiments, the encryption key request is transmitted from the user equipment to an application management function device or a policy control function device.

In some embodiments, the encryption key request is part of a non-access stratum request.

In various embodiments, the non-access stratum request comprises a policy provisioning request.

In one embodiment, the encryption key request is part of a registration request.

In certain embodiments, the encryption key response is received by the user equipment from an application management function device or a policy control function device.

In some embodiments, the encryption key response is part of a non-access stratum response.

In various embodiments, the encryption key request is transmitted from an application management function device or a policy control function device to a unified data device or a key management server.

In one embodiment, the encryption key response is received by an application management function device or a policy control function device from a unified data device or a key management server.

In certain embodiments, the encryption key request is transmitted from a unified data device to a key management server.

In some embodiments, the encryption key response is received by a unified data device from a key management server.

In various embodiments, the encryption key response comprises a key identifier.

In one embodiment, the encryption key response comprises an expiration time.

In one embodiment, a method comprises: receiving an encryption key request comprising security capabilities of a user equipment, wherein the encryption key request is for an application layer key; and in response to receiving the encryption key request, transmitting an encryption key response comprising a group encryption key.

In certain embodiments, the encryption key request is transmitted from the user equipment and received by an application management function device or a policy control function device.

In some embodiments, the encryption key request is part of a non-access stratum request.

In various embodiments, the non-access stratum request comprises a policy provisioning request.

In one embodiment, the encryption key request is part of a registration request.

In certain embodiments, the encryption key response is received by the user equipment and transmitted from an application management function device or a policy control function device.

In some embodiments, the encryption key response is part of a non-access stratum response.

In various embodiments, the encryption key request is transmitted from an application management function device or a policy control function device and received by a unified data device or a key management server.

In one embodiment, the encryption key response is received by an application management function device or a policy control function device and transmitted from a unified data device or a key management server.

In certain embodiments, the encryption key request is transmitted from a unified data device and received by a key management server.

In some embodiments, the encryption key response is received by a unified data device and transmitted from a key management server.

In various embodiments, the encryption key response comprises a key identifier.

In one embodiment, the encryption key response comprises an expiration time.

In one embodiment, an apparatus comprises: a receiver that receives an encryption key request comprising security capabilities of a user equipment, wherein the encryption key request is for an application layer key; and a transmitter that, in response to receiving the encryption key request, transmits an encryption key response comprising a group encryption key.

In certain embodiments, the encryption key request is transmitted from the user equipment and received by an application management function device or a policy control function device.

In some embodiments, the encryption key request is part of a non-access stratum request.

In various embodiments, the non-access stratum request comprises a policy provisioning request.

In one embodiment, the encryption key request is part of a registration request.

In certain embodiments, the encryption key response is received by the user equipment and transmitted from an application management function device or a policy control function device.

In some embodiments, the encryption key response is part of a non-access stratum response.

In various embodiments, the encryption key request is transmitted from an application management function device or a policy control function device and received by a unified data device or a key management server.

In one embodiment, the encryption key response is received by an application management function device or a policy control function device and transmitted from a unified data device or a key management server.

In certain embodiments, the encryption key request is transmitted from a unified data device and received by a key management server.

In some embodiments, the encryption key response is received by a unified data device and transmitted from a key management server.

In various embodiments, the encryption key response comprises a key identifier.

In one embodiment, the encryption key response comprises an expiration time.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method in a user equipment (UE), the method comprising:
    transmitting, from the UE, an encryption key request to an access and mobility management function (AMF) device or a policy control function (PCF) device as part of a non-access stratum request comprising security capabilities of the UE, wherein the encryption key request triggers the AMF device or the PCF device to communicate with a vehicle to everything (V2X) key management function (KMF) to obtain an application layer key, wherein the encryption key request is for the application layer key and the encryption key request comprises a group identifier (ID); and
    in response to transmitting the encryption key request, as part of a non-access stratum response from the AMF device or the PCF device, receiving, at the UE, an encryption key response comprising the application layer key corresponding to the group ID.

2. The method of claim 1, wherein the encryption key response comprises a key identifier.

3. The method of claim 1, wherein the encryption key response comprises expiration time.

4. An apparatus comprising:
    a physical transmitter that transmits an encryption key request to an access and mobility management function (AMF) device or a policy control function (PCF) device as part of a non-access stratum request comprising security capabilities of the apparatus, wherein the encryption key request triggers the AMF device or the PCF device to communicate with a vehicle to everything (V2X) key management function (KMF) to obtain an application layer key, wherein the encryption key request is for the application layer key and the encryption key request comprises a group identifier (ID); and
    a physical receiver that, in response to transmitting the encryption key request, receives an encryption key response from the AMF device or the PCF device, comprising the application layer key corresponding to the group ID.

5. The apparatus of claim 4, wherein the encryption key response comprises a key identifier.

6. The apparatus of claim 4, wherein the encryption key response comprises an expiration time.

7. A method in an access and mobility management function (AMF) device or a policy control function (PCF) device, the method comprising:
    receiving, from a user equipment (UE), an encryption key request as part of a non-access stratum request comprising security capabilities of the UE, wherein the encryption key request is for an application layer key and the encryption key request comprises a group identifier (ID);
    in response to receiving the encryption key request, communicating with a vehicle to everything (V2X) key management function (KMF) to obtain the application layer key; and
    in response to receiving the encryption key request, as part of a non-access stratum response, transmitting an encryption key response comprising the application layer key corresponding to the group ID.

8. The method of claim 7, wherein the encryption key response comprises a key identifier.

9. The method of claim 7, wherein the encryption key response comprises an expiration time.

10. An apparatus comprising an access and mobility management function (AMF) device or a policy control function (PCF) device, the apparatus further comprising:
    a physical receiver that receives, from a user equipment (UE), an encryption key request as part of a non-access stratum request comprising security capabilities of the UE, wherein the encryption key request is for an application layer key and the encryption key request comprises a group identifier (ID); and
    a physical transmitter that:
        in response to receiving the encryption key request, communicates with a vehicle to everything (V2X) key management function (KMF) to obtain the application layer key; and
        in response to receiving the encryption key request as part of a non-access stratum response, transmits an encryption key response comprising the application layer key corresponding to the group ID.

11. The apparatus of claim 10, wherein the encryption key response comprises a key identifier.

12. The apparatus of claim 10, wherein the encryption key response comprises an expiration time.

* * * * *